Aug. 7, 1928.
W. J. WARD
GREASE GUN
Filed May 27, 1927
1,679,511
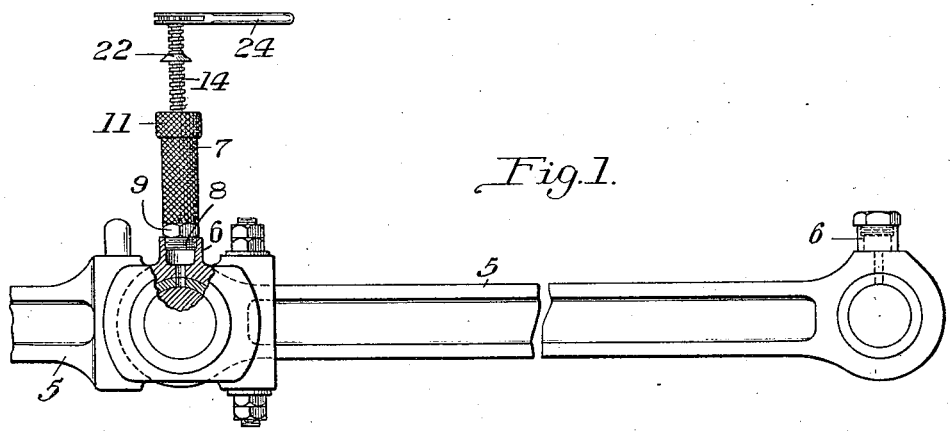
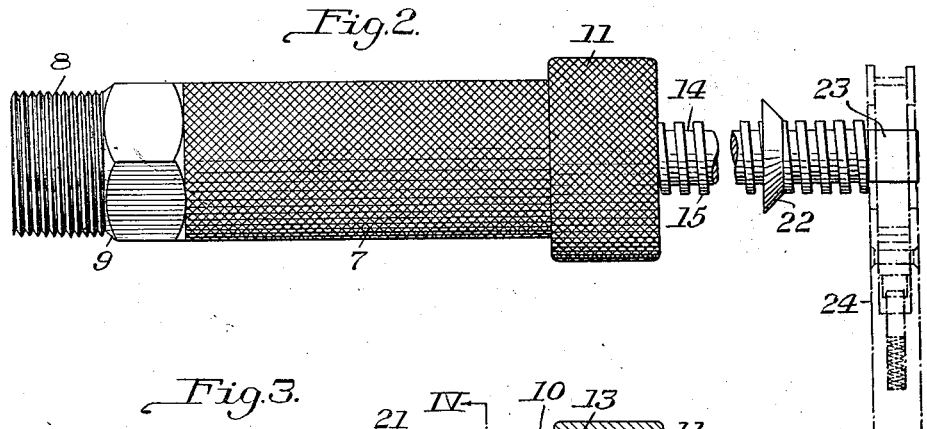
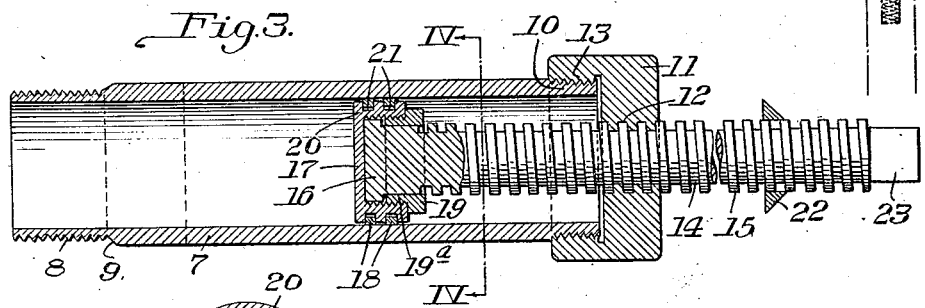
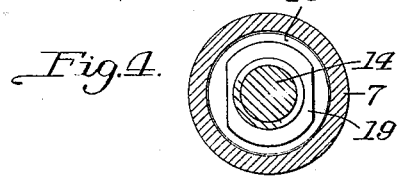
INVENTOR
William J. Ward
by W.T. Doolittle
Attorney.

Patented Aug. 7, 1928.

1,679,511

UNITED STATES PATENT OFFICE.

WILLIAM J. WARD, OF HAZELWOOD, PENNSYLVANIA, ASSIGNOR OF ONE-HALF TO CLIFFORD F. PUGH, OF PITTSBURGH, PENNSYLVANIA.

GREASE GUN.

Application filed May 27, 1927. Serial No. 194,554.

My invention relates to improvements in grease guns of the type designed to feed grease to grease cups, the grease utilized being in the form of a cylindrical cake or cartridge, the present invention being particularly designed for filling grease cups mounted on the main and side rods of a locomotive.

Grease guns heretofore employed for filling the cups on the locomotive main and side rods have many objectionable features, for example, they are so heavy and cumbersome that they cannot be applied to the cups to be filled without considerable trouble; they include operating levers of considerable length for the pressure applying means, rendering it impossible when the grease cups are in certain positions to apply the gun to the cups; it is necessary to insert the grease cake through an opening formed in the wall of the gun barrel and in the operation of inserting the cake, the grease cake becomes soiled and contaminated by handling, grit and other foreign substances coming into contact with and adhering to the cake.

Among the objects of my invention are, to provide a simple, strong and easily applied grease gun construction; a construction enabling the grease cake to be readily introduced to the gun barrel without soiling the cake; and to provide a construction eliminating levers and their accompanying disadvantages.

Various additional objects and advantages will either be pointed out or become apparent from a consideration of an operative embodiment as described hereinafter and illustrated by the accompanying drawings.

In the accompanying drawings, which illustrate an application of my invention,

Fig. 1 is an elevational view, showing my invention applied to a grease cup of a locomotive side rod;

Fig. 2, an elevational view of the grease gun embodying my invention;

Fig. 3, a longitudinal sectional view; and

Fig. 4, a sectional view taken on line IV—IV of Fig. 3.

Referring to the drawings, 5 designates a conventional locomotive side rod carrying a grease cup 6, of the usual or any preferred construction, to which the grease gun is designed to be applied for forcing grease into the cup.

My improved grease gun, as illustrated and as preferred, includes a hollow body member or barrel 7 formed at one end with a threaded portion 8, said portion 8 being adapted to be entered in and engage a threaded portion of the grease cup 6; a stop head 9 having a shoulder to engage the cup 6 when the body is screwed into operative position on the cup, said barrel or hollow body member also being formed at its opposite end with a slightly reduced threaded portion 10.

Mounted on the threaded end portion 10 of the body, and closing that end of the hollow body, is a cap member 11. Cap member 11 is formed with a centrally disposed threaded bore 12 and an inner threaded portion 13, the latter portion being adapted to engage the threaded portion 10 of the body.

The pressure applying means, as illustrated, include a stout, threaded plunger or piston stem 14 having square threads 15 formed thereon and having an enlarged end 15, the latter being designed to carry a movable wall or the head of the plunger or piston designated generally by the numeral 17. Said stem 14 as shown, is of a diameter approximately half or greater than half the diameter of the bore of the barrel. Head or wall 17 is rotatably mounted on the enlarged end 16, and comprises two split metallic packing rings 18, a collar 19, and an internally threaded member 20 carried on a threaded portion 19a of collar 19, said member 20 being formed with annular grooves 21 to receive the packing rings 18. The head 17 is of such a size as to provide a tight sliding fit within the barrel when the parts are assembled for use. The last mentioned parts provide a piston head substantially solid throughout.

In operation, the square threads 15 of the stem are designed to cooperate with the corresponding threads of the threaded bore 12 of cap member 11, and, for the purpose of limiting the inward or pressure applying movement of the piston and its head, I preferably provide a stop member 22 on the piston stem, said member being adapted to engage the outer end portion of the cap to arrest the inward movement of the stem.

The outer end of the stem 14 is formed with a squared end 23 adapted to receive a ratchet wrench 24, of any desirel construction, or other suitable means for turning the stem.

From the above, it will be understood that an inward and outward movement of the stem and its head may be effected by turning the wrench in the desired direction, and that the pressure against the inserted cake or grease is applied in a direct line and, therefore, the gun, while in use and while applied to the grease cup, is less liable to injure the threads of the cup than when levers are employed for actuating the stem.

In the practice of my invention, the cylindrical cake of grease may be transferred from its wrapper directly into the open end of the hollow body member without causing it to come into contact with any foreign substance, and, after the insertion of the cake, the gun structure may be readily applied to the grease cup.

What I claim is:

1. In a grease gun primarily for filling cups of main and side rods of locomotives, a hollow grease-container body of substantially uniform diameter throughout its length, means for securely attaching one end of said body to the cups, a cap on said body, a grease-expressing piston having a stem passing through said cap into the body, said stem being relatively stout, said cap and stem having interengaging screw threads whereby said stem may be screwed down to express grease, and thereby avoid tilting strains on the gun and consequent rupture of said cups when the gun is operated.

2. In a grease gun primarily for filling cups of main and side rods of locomotives, a hollow grease-container body having screw threads so as to be attachable to the screw threads of the cups, said body being of a size to accommodate a complete grease cartridge insertible through its attaching end, a cap on said body, a stem passing through said cap into the body, said stem being relatively stout and having an enlarged end located within the body, a cup-shaped head loosely receiving said enlargement, a collar loosely overlapping said enlargement and secured to the head, said enlarged end, adjacent portion of the stem, said head and said collar collectively forming a piston-head substantially solid throughout, said cap and stem having interengaging screw threads whereby said stem may be screwed down to express grease, and thereby avoid tilting strains on the gun and consequent stripping of the screw threads of the gun and cups when the gun is operated.

3. In a grease gun primarily for filling cups of main and side rods of locomotives, a hollow grease-container barrel having screw threads so as to be attachable to the screw threads of the cups, said barrel being of a size to accommodate a complete grease cartridge insertible through its attaching end, a cap on said barrel, a stem passing through said cap into the barrel being of a diameter approximately half or greater than half that of the bore of the barrel, said stem having an enlarged end located within the barrel, a cup-shaped head loosely receiving said enlargement, a collar loosely overlapping said enlargement and secured to the head, said enlarged end, adjacent portion of the stem, said head and said collar collectively forming a piston-head substantially solid throughout, said cap and stem having interengaging screw threads whereby said stem may be screwed down to express grease, and thereby avoid tilting strains on the gun and consequent stripping of the screw threads of the gun and cups when the gun is operated.

In testimony whereof I affix my signature.

WILLIAM J. WARD.